March 16, 1954 S. VAN MIERLO ET AL 2,672,526
PULSE ELECTRICAL TELECOMMUNICATION SYSTEM
Filed March 19, 1951 2 Sheets-Sheet 1
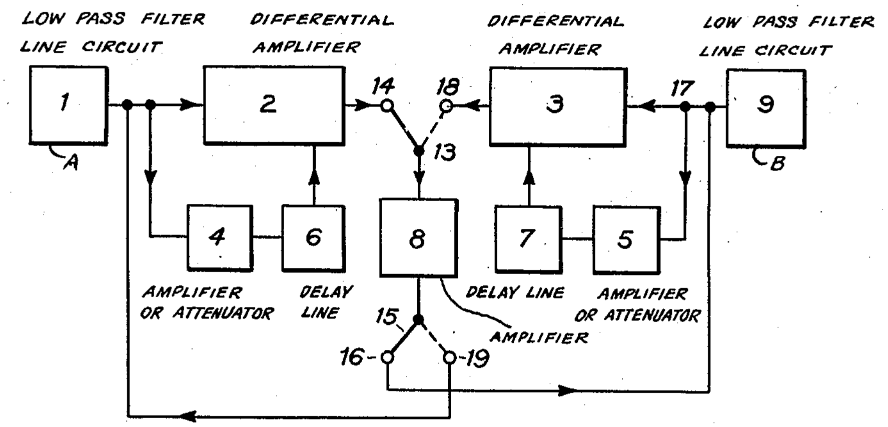
Fig. 1
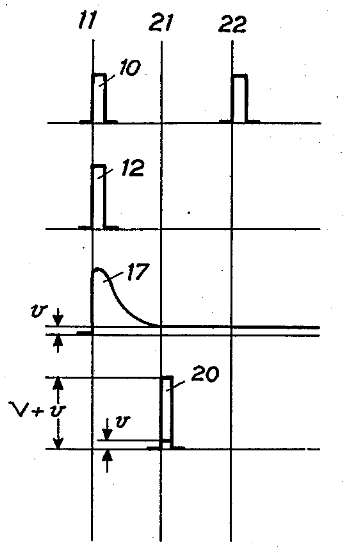
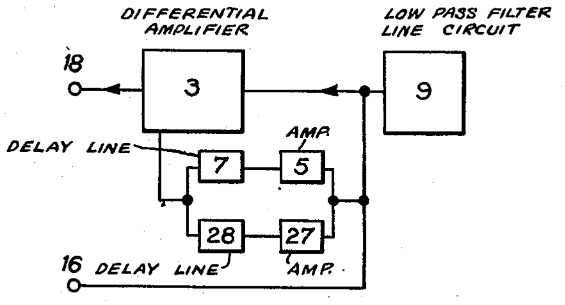
Fig. 3
Fig. 2
INVENTOR
STANISLAS VAN MIERLO
PIERRE R. R. AIGRAIN
BY Robert Harding Jr.
ATTORNEY INVENTOR
STANISLAS VAN MIERLO
PIERRE R. R. AIGRAIN
BY Robert Harding Jr.
ATTORNEY Patented Mar. 16, 1954

2,672,526

UNITED STATES PATENT OFFICE 2,672,526

PULSE ELECTRICAL TELECOMMUNICATION SYSTEM

Stanislas Van Mierlo and Pierre Raoul Roger Aigrain, Paris, France, assignors to International Standard Electric Corporation, New York, N. Y., a corporation of Delaware Application March 19, 1951, Serial No. 216,354

4 Claims. (Cl. 179—170)

The present invention relates to pulse electrical telecommunication systems, and more particularly, the invention relates to multiplex by time division in which several transmissions are made simultaneously, the corresponding circuit being successively placed into communication.

In such systems, when it is necessary to effect a transmission simultaneously in both directions, the amplifier connecting the two corresponding circuits is alternatively connected first in one direction and then in the second direction.

When voice frequency currents are transmitted by means of such systems, the frequency of alternation of communications for the two given circuits is of the order of 20,000 cycles per second and if, for example, sixteen communications can take place simultaneously, the duration of a communication in one direction or in the other cannot exceed three micro-seconds. The receiving device for each of the circuits in communication comprises inter alia a low pass filter which permits the restoration by integration of the voice frequency currents transmitted, said filter having a well determined response curve. If one considers an impulse of predetermined duration, for example, three microseconds, transmitted from a circuit A towards a circuit B, it produces in circuit B an impulse the maximum amplitude of which is a function of the amplitude of the impulse transmitted from A to B, but the duration of which is greater than three microseconds.

At the time when circuit B is placed in communication with circuit A, the amplifier, then operating in the direction from B to A, transmits to circuit A an impulse of a duration of three microseconds, the amplitude of which is the sum of the amplitude resulting from circuit B considered as a transmitter and of the amplitude of the impulse produced in circuit B in response to the impulse transmitted from circuit A at the time at which the amplifier operates from B towards A. The component of the impulse transmitted from circuit B towards circuit A resulting from the remaining amplitude of the impulse transmitted at the preceding instant of time from circuit A towards circuit B produces a noise, known as "Larsen" or "local noise," the phenomena taking place again and being amplified according to a process identical when the transmission takes place from A towards B at the following instant of time.

One of the objects of the present invention is to reduce, in transmission systems utilising bidirectional amplifiers, the drawback resulting from the so-called "Larsen" noise.

According to a feature of the invention a bidirectional amplifier intended for amplifying impulses between two circuits periodically placed in communication, comprises in combination an amplifier circuit, means adapted for connecting the said amplifier successively in one direction and then in the other, associated with means connected respectively between each one of the said two circuits and the two extremities of the said amplifier circuit, each one of the said means being adapted for transmitting to the input of the said amplifier, which is periodically connected thereto, impulses the amplitude of which is independent of the amplitude of the impulses transmitted at the preceding instants of time by the circuit connected to the other extremity.

According to another feature of the invention, in systems of the type in which two circuits A and B are successively connected to the input of an amplifier circuit at instants of time $t$ and $t+t_1$, the means used for transmitting to the amplifier circuit, for example, from circuit A, impulses the amplitude of which is independent of the impulses transmitted at the preceding instants of time by circuit B, comprises, in combination, a so-called "differential circuit" which supplies signals at its output having an amplitude proportional to the difference of amplitude of the two signals which are applied to its two input terminals, a circuit associated with the differential circuit adapted for receiving the impulses transmitted by circuit B toward circuit A at the instant of time $t$, in order to modify their amplitude, so as to render the said impulses the amplitude of which has been modified by one time interval equal to $t_1$ substantially equal to the amplitude of the said impulses at the terminal of circuit A at the instant of time $t+t_1$ and to delay said impulses by an interval $t_1$, the output from the said circuit being connected to one of the input terminals of the said differential circuit, associated with means adapted for transmitting to the other input terminal of the said differential circuit an impulse the amplitude of which is equal to the potential difference at the terminals of circuit A.

According to another feature of the invention the circuit adapted to modify the amplitude of the signals and to delay same comprises, in combination, amplifying means, such as a suitable amplifier, associated with attenuation or damping means, the ouput current from the said two circuits being transmitted to a delay line, adjusted in a suitable way, the output of said line being connected to one of the terminals of the said differential circuits.

Other features and advantages of the invention will appear on reading the following description of an embodiment of the invention utilising certain of its features, the said description being given in connection with the accompanying drawings in which:

Fig. 1 represents a bidirectional amplifier incorporating features of the invention;

Fig. 2 represents the shape of the impulses at various points of the circuit shown in Figure 1;

Fig. 3 represents an alternative to the arrangement shown in Figure 1; and

Figure 1 represents a basic schematic of a bidirectional amplifier, adapted, for example, to amplify impulses between two circuits, such as the two circuits of lines A and B (represented by blocks 1 and 9), connected to one of the channels at the two extremities of a multiplex junction, the communication being periodically and successively established in one direction and then in the other.

Figure 4:
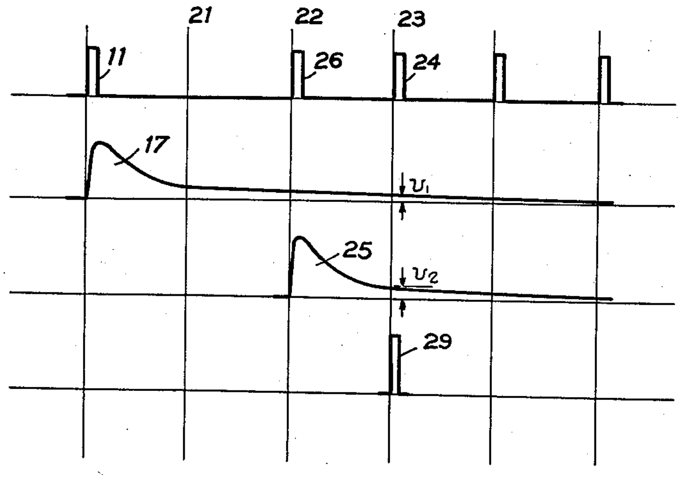
Fig. 4 represents the shape of the impulses in various points of the circuit shown in Figure 3.

In such systems, subscribers' line circuits comprise a low pass filter in order to reconstitute the signals at their arrival. The circuits represented by schematic blocks 2 and 3 are circuits producing output signals the amplitude of which is proportional to the difference of amplitude of the signals which are transmitted thereto; circuits of this type are well known in the art and there will be given later an example. The schematic blocks 4 and 5 represent, depending upon the particular requirements, attenuators, amplifiers, or amplifiers followed by attenuators, or more broadly circuits producing output signals the amplitude of which is equal to the amplitude of the signals transmitted multiplied by $k$, $k$ being a positive number greater or smaller than 1. The schematic blocks 6 and 7 represent delay lines; the schematic block 8 is an amplifier; the means used for effecting the necessary switching operations, such as the connection of amplifier 8, are, for example, electronic means, using, for instance, vacuum tubes, gas tubes, or a network of rectifying cells. There will be described later an example of such arrangement which may be used satisfactorily.

If there is considered one impulse 10 (Figure 2) applied at instant 11 to circuit 2 (Figure 1), from a circuit A, represented by schematic block 1, it is assumed that at instant 11 (Figure 2) the input 13 of amplifier 8 is connected to terminal 14 and that the output 15 is connected to terminal 16. The impulse 12 (Figure 2), derived from the output circuit 2, is transmitted by amplifier 8 on the one hand to circuit 9 (circuit B) and on the other hand to circuit 5. Circuit 9 comprises, as has been stated, a low pass filter, and the impulse 12 which is transmitted thereto is transformed into an impulse 17, the amplitude of which decreases exponentionally. At instant 21, the terminals 13 and 15 of amplifier 8 are respectively connected to terminals 18 and 19. Circuit 9 operates then as a transmitter, and, since the amplitude of the impulse transmitted from circuit 1 is still noticeable, being represented by $v$, there is transmitted to circuit 3 an impulse 20, the amplitude of which is the sum of amplitude V of the impulse proper from circuit 9, operating as a transmitter, and of the amplitude $v$ of the impulse 17 at instant 21. Circuit 5 is adjusted in order to supply in its output an impulse the amplitude of which is equal to the amplitude $v$ of impulse 17 at instant 21. The delay line 7 is adjusted in order to delay the output impulse from circuit 5 by the interval of time separating the intervals 11 and 21. In this case circuit 3 receives simultaneously at instant 21 an impulse the amplitude of which is $V+v$, transmitted by circuit 9, and an impulse of amplitude $v$, transmitted by circuit 7. There will therefore be produced in the output an impulse the amplitude of which is proportional to the difference of the amplitudes of the impulses which are transmitted, that is to say $(V+v)-v=V$, or, in other words, an impulse the amplitude of which is proportional to the impulse proper from circuit 9. At instant 22, circuit 1 operates again as a transmitter and the elements 2, 4 and 6, fulfill functions similar to the functions fulfilled by elements 3, 5 and 7 at instant 21. The amplitude of the impulse transmitted from circuit 9 towards circuit 1 is therefore independent of the amplitude of the impulse transmitted at the preceding instant of time from circuit 1 towards circuit 9. There is thus avoided the appearance in the circuit of a noise, known in the art as "Larsen" or "local noise" which could give rise to the setting up of oscillations. When the intervals of time separating the instants 11 and 21 and the instants 21 and 22 are identical the delay lines 6 and 7 are adjusted accordingly in order that the delay brought by delay line 6 be equal to the interval of time separating the instants 21 and 22 and the delay line 7 causes a delay equal to the time interval separating the instants 11 and 21.

An amplifier of this type may be used for successively and periodically amplifying impulses, the amplitude of which is modulated by voice frequency currents transmitted in one direction and then in the other direction over a multiplex link, connecting a plurality of circuits, which are connected at both extremities of the multiplex junction, two by two over a same recurrent position in time. Ai, with $i=1, 2, \ldots n$, will designate the circuits connected at one end of the extremities of the multiplex junction, and Bj, with $j=1, 2 \ldots n$, will designate the circuits connected at the other extremity, two circuits connected to the same channel of the said junction, for example, during the same position in time being allotted the same index. In order that the system described be applicable in practice, it is necessary that the interval of time $t_1$, separating the instant of time at which an impulse is transmitted from A towards B from the following instant during which an impulse is transmitted from B towards A, be the same regardless of the number of circuits. Likewise the interval of time $t_2$, separating the instant of time at which an impulse is transmitted from B towards A from the following instant during which an impulse is transmitted from A towards B, must be the same regardless of the number of circuits, $t_1$ and $t_2$ being possibly different.

It has been assumed that the amplitude of impulse 17 (Fig. 2) had a noticeable amplitude $v$ at instant 21 during which circuit 9 transmits an impulse towards circuit 1. In some cases, impulse 17 may still have a noticeable amplitude $v_1$ (Fig. 4) at instant 23 during which circuit 9 transmits another impulse 24 towards circuit 1. Thus, the output impulse 29 at the instant 23 will be the sum of the impulse proper 24 and what is left of the impulse 17 and the next preceding impulse 25. In this case it is also necessary to provide a modification of the amplitude of the impulse 29, outgoing from circuit 9 at instant 23, in function of the remaining amplitude of impulses 17 and 25, the latter being the second impulse from circuit 1. Let $v_1$ be the amplitude of impulse 17 at instant 23, and let $v_2$ be the amplitude at instant 23 of the impulse 25, resulting from applying to circuit 9 an impulse 26 sent at instant 22 by circuit 1. There have been shown in Fig. 4 the various forms of the impulses.

The circuit shown schematically in Fig. 3 permits the taking into account of the amplitude of impulses 17 and 25 at instant 23. The elements 3, 5, 7, 9, 16 and 18 fulfill functions identical to those fulfilled by elements bearing the same reference characters in Fig. 1. Circuit 27 is a circuit analogous to circuit 5; however it is adjusted in order to supply in its output an impulse the amplitude $v_1$ of which is a function of the amplitude of impulse 17 at the instant 23 which is applied thereto by amplifier 8 (not shown in Figure 3) from a circuit 1. Circuit 28 is a delay line which delays the output impulse from circuit 27 by a quantity equal to the interval of time separating the instants 11 and 23. Circuit 9 will deliver its impulse proper plus the sum of the residual impulses, having amplitudes $v_1$ and $v_2$. Circuit 3 receives therefore, simultaneously, the total impulse outgoing from circuit 9 at instant 23 from the output impulses with amplitudes $V_1$ and $V_2$ from the delay lines 7 and 28. There will be obtained in the output circuit 3, which is connected to the input of amplifier 8 (Fig. 1), an impulse the amplitude of which is proportional to the difference between the total amplitude of the impulse outgoing from circuit 9 and the sum of the amplitudes of the output impulses from delay lines 7 and 28. The amplitude of this impulse transmitted to circuit 1 is then independent of the amplitude of the two preceding impulses transmitted from circuit 1.

While the principles of the invention have been described above in connection with specific embodiments, and particular modifications thereof, it is to be clearly understood that this description is made only by way of example and not as a limitation on the scope of the invention.

What is claimed is:

1. An amplifying system comprising two pairs of terminals, an amplifier, means for alternately connecting said amplifier between the terminals of each pair at a rate at least twice the maximum frequency to be transmitted, whereby signals are alternately transmitted in opposite directions, first line circuit means connected to one terminal of each pair of terminals, second line circuit means connected to the other terminal of each pair of terminals, said line circuit means each comprising a low pass filter and being adapted for transforming the transmitted intermittent signals into the desired signals, and means connected between each line circuit means and said amplifier to compensate in the common amplifier for the effect of the signal transmitted in one direction on the signal transmitted in the opposite direction, said means comprising means for deriving secondary signals from signals transmitted towards said line circuit means, means for delaying said derived secondary signals until they coincide with the time positions of the signals transmitted by said line circuit means, and means for subtracting such delayed derived secondary signals from the signals transmitted by said line circuit means.

2. A system, according to claim 1, in which the means for deriving the secondary signals is adjusted so that the amplitudes of delayed secondary signals are proportional to the amplitude of the signal generated at one line circuit means which appears at the other line circuit means when said other line circuit means is transmitting.

3. A system, according to claim 1, in which the means for alternately connecting the amplifier between pairs of terminals comprises an arrangement whereby the connecting times are equally spaced.

4. A system, according to claim 1, in which the compensating means comprises a differential amplifier having two inputs and an output, means to apply a signal transmitted from the line circuit to one of said inputs, and means to apply a secondary signal from the delaying means to the other of said inputs, said differential amplifier being arranged to produce an output which is the difference between the signals of said two inputs.

STANISLAS VAN MIERLO.
PIERRE RAOUL ROGER AIGRAIN.

References Cited in the file of this patent

UNITED STATES PATENTS

| Number | Name | Date |
|---|---|---|
| 2,117,708 | Davis | May 17, 1938 |
| 2,311,021 | Blumlein | Feb. 16, 1943 |
| 2,410,350 | Labin | Oct. 29, 1946 |
| 2,520,185 | Mierlo | Aug. 29, 1950 |
| 2,527,558 | Levy | Oct. 31, 1950 |